UNITED STATES PATENT OFFICE.

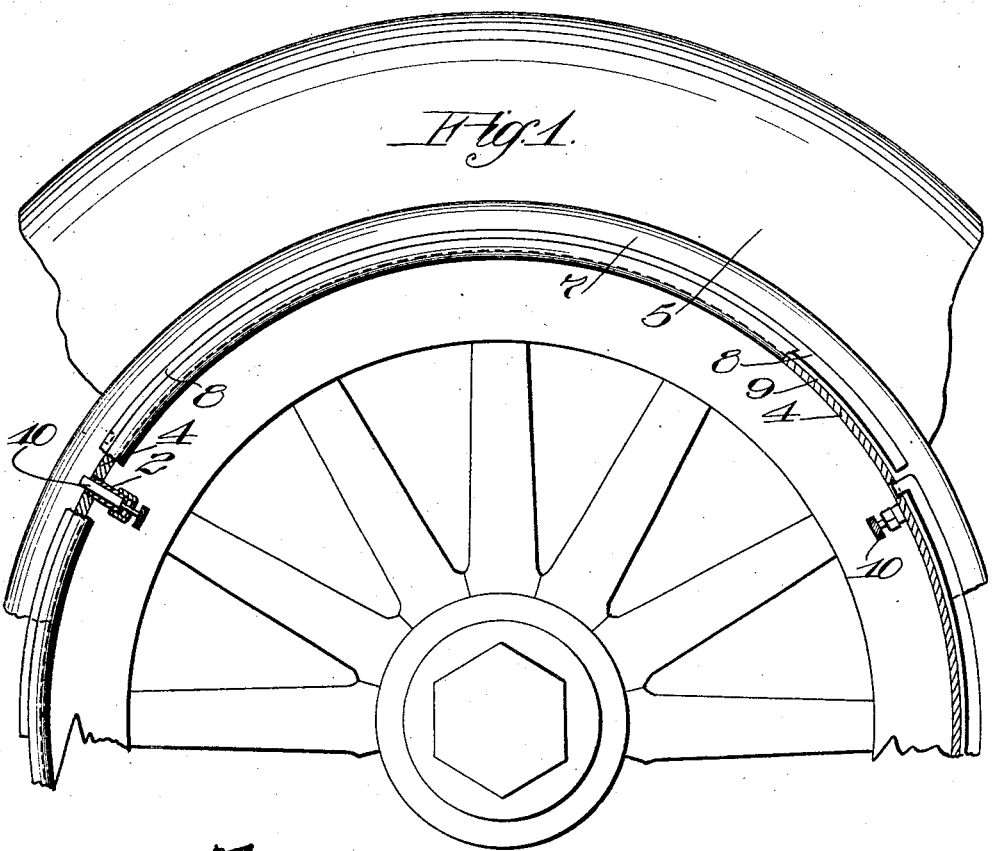

PETER RECCONI, OF SAN FRANCISCO, CALIFORNIA.

TIRE-CLENCHER-RING LOCK.

1,046,853.  Specification of Letters Patent.  Patented Dec. 10, 1912.

Application filed October 21, 1911. Serial No. 655,899.

*To all whom it may concern:*

Be it known that I, PETER RECCONI, a subject of the King of Italy, residing in the city and county of San Francisco and State of California, have invented new and useful Improvements in Tire-Clencher-Ring Locks, of which the following is a specification.

This invention relates to vehicle wheels, and particularly to a means for facilitating the removal of tires from wheels and for insuring against their accidental displacement.

The object of the present invention is to provide a device whereby the removal of vehicle tires and particularly pneumatic tires may be greatly facilitated; and to provide a device which is capable of being used as a lock to prevent the accidental movement of a clencher-ring after the tire is in position and inflated, and which device is also designed with the function of operating as a latch or restraining lock to hold the clencher-ring free of the snap ring during the removal of the latter.

The invention consists of the parts and the construction and combination of parts as hereinafter more fully described and claimed, having reference to the accompanying drawings, in which—

Figure 1 is a side elevation in partial section of a fragment of a wheel. Fig. 2 is a cross sectional view through the tire and a lock. Fig. 3 shows the position of the lock on the inner edge of the clencher-ring. Fig. 4 shows a modified form of construction of lock.

As a large number of automobile and other vehicle tires are designed to be readily removed but firmly and reliably held in position when inflated, and in view of the great difficulties encountered when it is desired to detach or remove the tire from the wheel on account of the removal of the devices which are utilized to retain the tire upon the wheel, it is the object of the present invention to provide a simple, inexpensive, and easily manipulated device adapted to be attached to the tire-holding rim and by which device the tire-holding elements are rendered much more easily detachable.

In carrying out the purposes of my invention I employ a small sleeve or bushing 2 which may be threaded at one end, as 3, and thereby or otherwise secured in the rim 4 of the vehicle, upon which rim it is customary to retain a detachable or removable tire indicated at 5. In many instances the tire 5, which is provided with clencher flanges or annular beads, is restrained from lateral movement on one side by a continuous stiff clencher-ring, indicated at 7, which is adapted to slide laterally over one side of the wheel rim 4. After a tire 5 has been passed over the rim 4 of the wheel, the clencher-ring 7 is pressed against one side of the tire, as indicated, and held in such position upon the rim 4 as to enable the operator to snap a split ring 8 into a seat 9 formed on one side of the rim 4. The object of the snap ring 8 is to act as a shoulder or stop against which the outer edge of the clencher-ring 7 may abut and be supported, and thus lock against further lateral movement over the edge of the rim 4.

The use of extremely stiff tire structures as 5 renders it extremely difficult to easily remove the snap ring 8 from its seat 9 when it is desired to take the tire 5 from the rim 4. This resistance and difficulty is encountered by reason of the natural expansibility and resiliency of the structure of which the tire 5 is formed, and it is ordinarily necessary to use special appliances or several tools and generally requires two persons to quickly remove a tire. To this end I provide the bushings 3 and in these I mount a slidable bolt 10 of sufficient length to be projected inwardly to engage the outer surface of and to support the clencher-ring 7 when this has been depressed to the position indicated in Fig. 2, after the tire 5 has been deflated sufficiently to allow one of its sides to be pressed inwardly as shown.

When the operator desires to remove a tire he first causes it to be deflated and then may press the clencher-ring 7 to the position indicated in Fig. 2 and by simply sliding the bolt 10 outwardly through its bushing, as the bushing 3, until it projects through the rim 4, the latter will be supported against outward lateral movement over the rim 4 by the expansion of the tire 5. Having thus pressed the ring 7 inward at one part, he simply then presses another portion adjacent to which may be another of the locks 10 and having sufficiently pressed in the ring, 7, the operator pushes the lock 10 outwardly until it projects through the rim 4 and engages the ring 7. Likewise by pressing the entire ring 7 throughout its circumference until all of its parts have been carried inwardly sufficiently to entirely clear the snap or lock ring 8, the latter may then readily be unseated from the groove 9 without having to contend with the resistance offered ordinarily by the pressure of the clencher-ring 7 when it is resting against the snap ring 8. I have found in actual practice that three of the locks 10 arranged at regular intervals around the rim are entirely sufficient to permit an easy and rapid demounting of the snap ring 8 or ring 7 and the tire 5 from the wheel.

Another very important function of the device is that it may be utilized to lock the clencher-ring 7 in outermost position when it is supported against the snap ring 8, as indicated in Fig. 3, in which position the parts are held when the tire is fully inflated, and the bolt 10 may be pressed outwardly until it projects sufficiently through the rim 4 to prevent the inward movement of the clencher-ring 7. It frequently happens during the operation of a vehicle wheel that the tire 5 will become accidentally deflated and thus permit the ring 7 to slide freely, and if the wheel be revolving at rapid speed the snap ring 8 will be centrifugally thrown from the rim 4, and after such occurrence the clencher-ring 7 will be free to shift laterally off of the rim 4 thus releasing entirely the tire 5 which will soon be thrown from the wheel with possibly resulting injury to riders or occupants of the vehicle.

Any suitable means may be employed to offer sufficient friction to prevent accidental or too loose movement or play of the bolt 10 in its respective bushing 3. In Fig. 2 a sufficient friction is created upon the bolt 10 by a packing gland 11; the friction of the packing in the gland 11 being intended to be sufficient to prevent the bolt 10 from moving of its own accord.

In Fig. 4 I have shown a slightly modified form of friction device in which the head of the bolt is shown as provided with a plurality of spring tongues 12 adapted to engage in a series of annular grooves 13 formed in the external surface of the bushing indicated at 3'.

Having thus described my invention, what I claim and desire to secure by Letters Patent is—

1. The combination with a vehicle tire, of a rim upon which the tire is supported, a removable clencher-ring slidably mounted on the rim and engaging one side of the tire, a snap-ring seated in the rim and adapted to restrain the clencher-ring from outward movement, and a pin movably mounted in the rim and adapted to lock behind the clencher-ring, when the latter is forced inward past said pin, whereby the clencher-ring is held against return movement and out of engagement with the snap-ring.

2. The combination with a vehicle tire, of a rim upon which the tire is supported, a removable clencher-ring slidably mounted on the rim and engaging one side of the tire, a snap-ring seated in the rim and adapted to restrain the clencher-ring from outward movement, and a spring-pressed pin movably mounted in the rim and adapted to automatically lock behind the clencher-ring when the latter is forced inward past the end of said pin, whereby the clencher-ring is held against return movement and out of engagement with the snap-ring.

In testimony whereof I have hereunto set my hand in the presence of two subscribing witnesses.

PETER RECCONI.

Witnesses:
JOHN H. HERRING,
FRANK W. GILLIN.